March 24, 1964  J. H. BREMS  3,126,472
CONTOUR WELDING MACHINE
Filed June 22, 1961  8 Sheets-Sheet 5
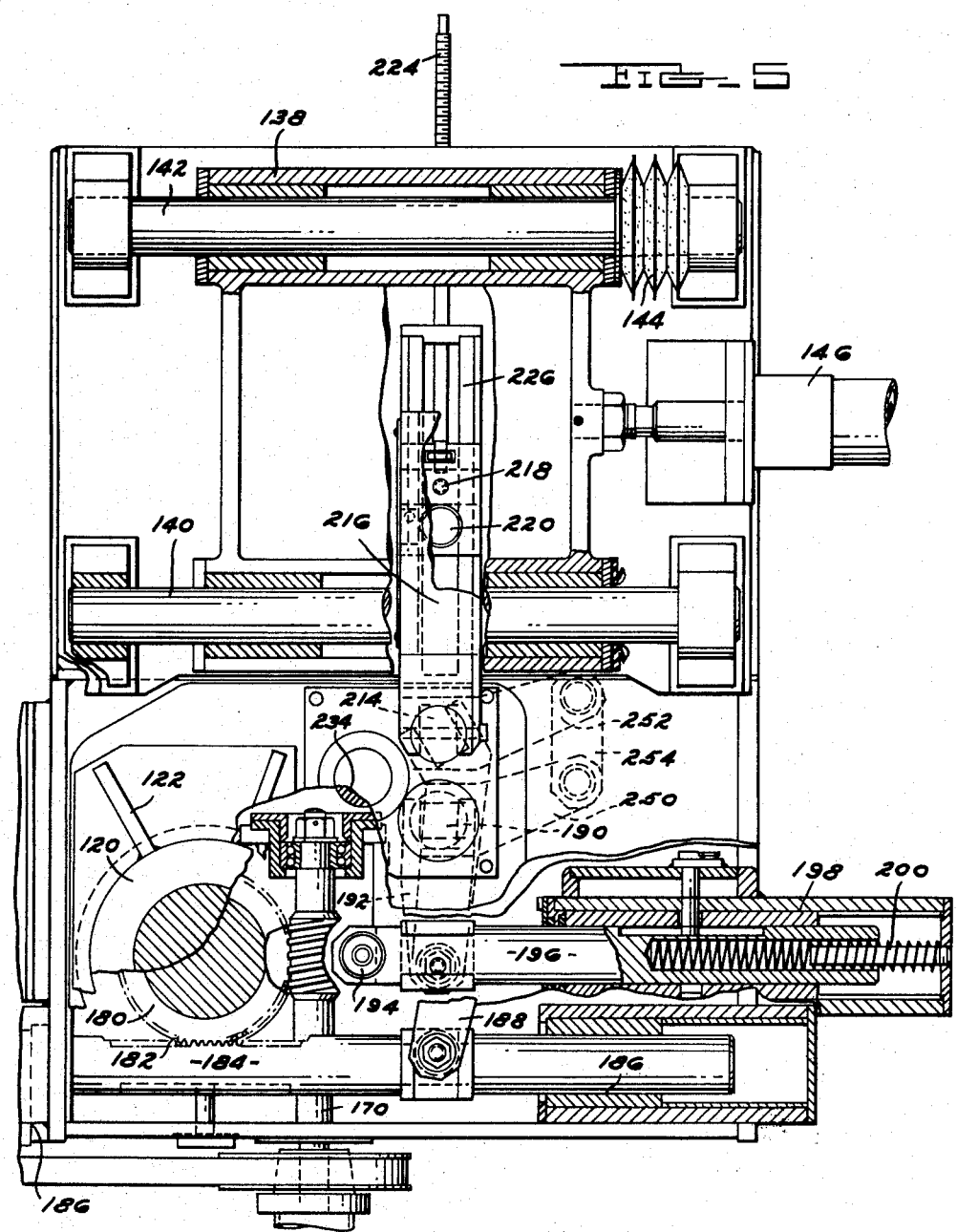
INVENTOR.
JOHN H. BREMS
BY
Barnes, Kisselle, Raisch & Choate
ATTORNEYS

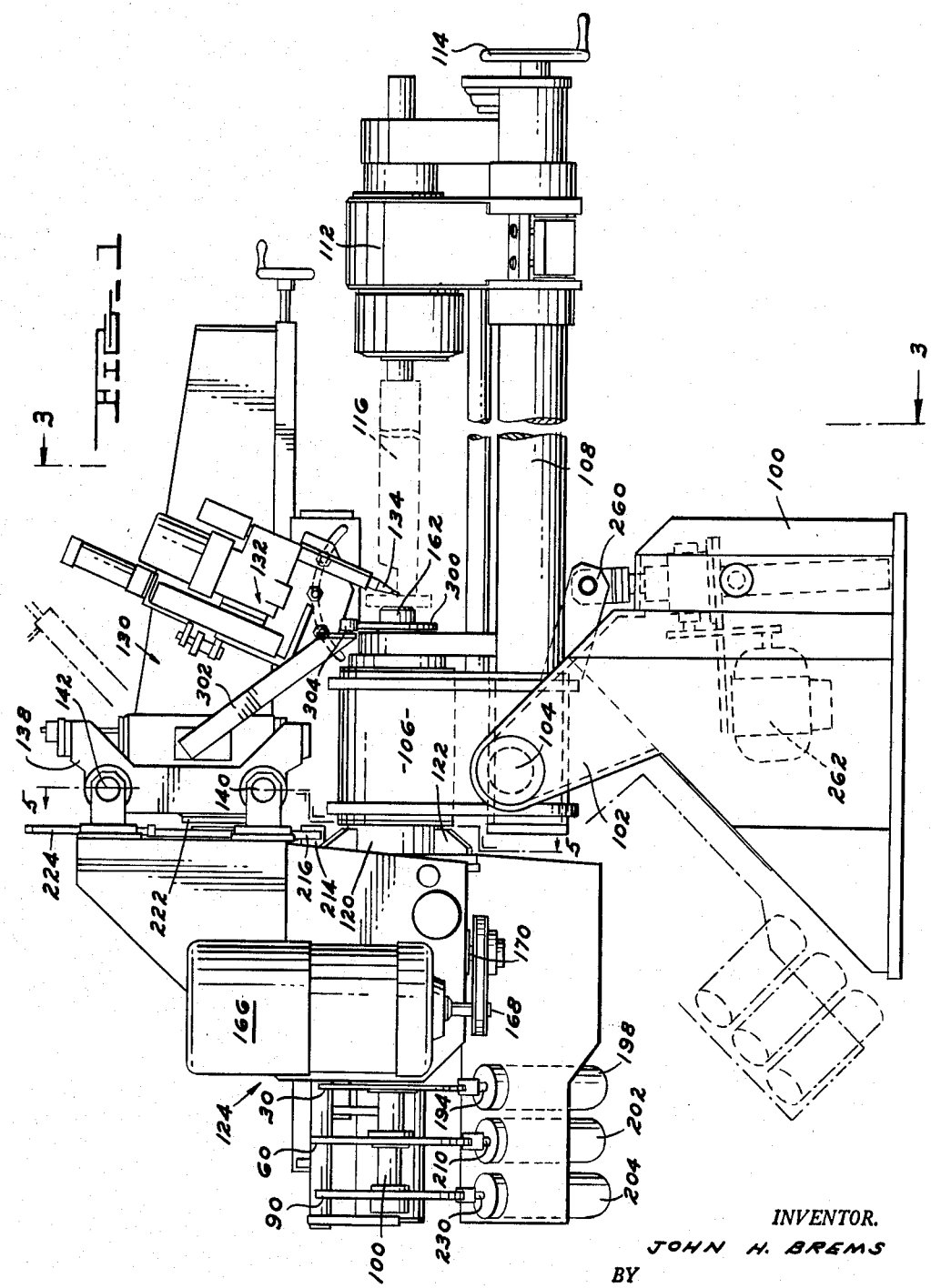

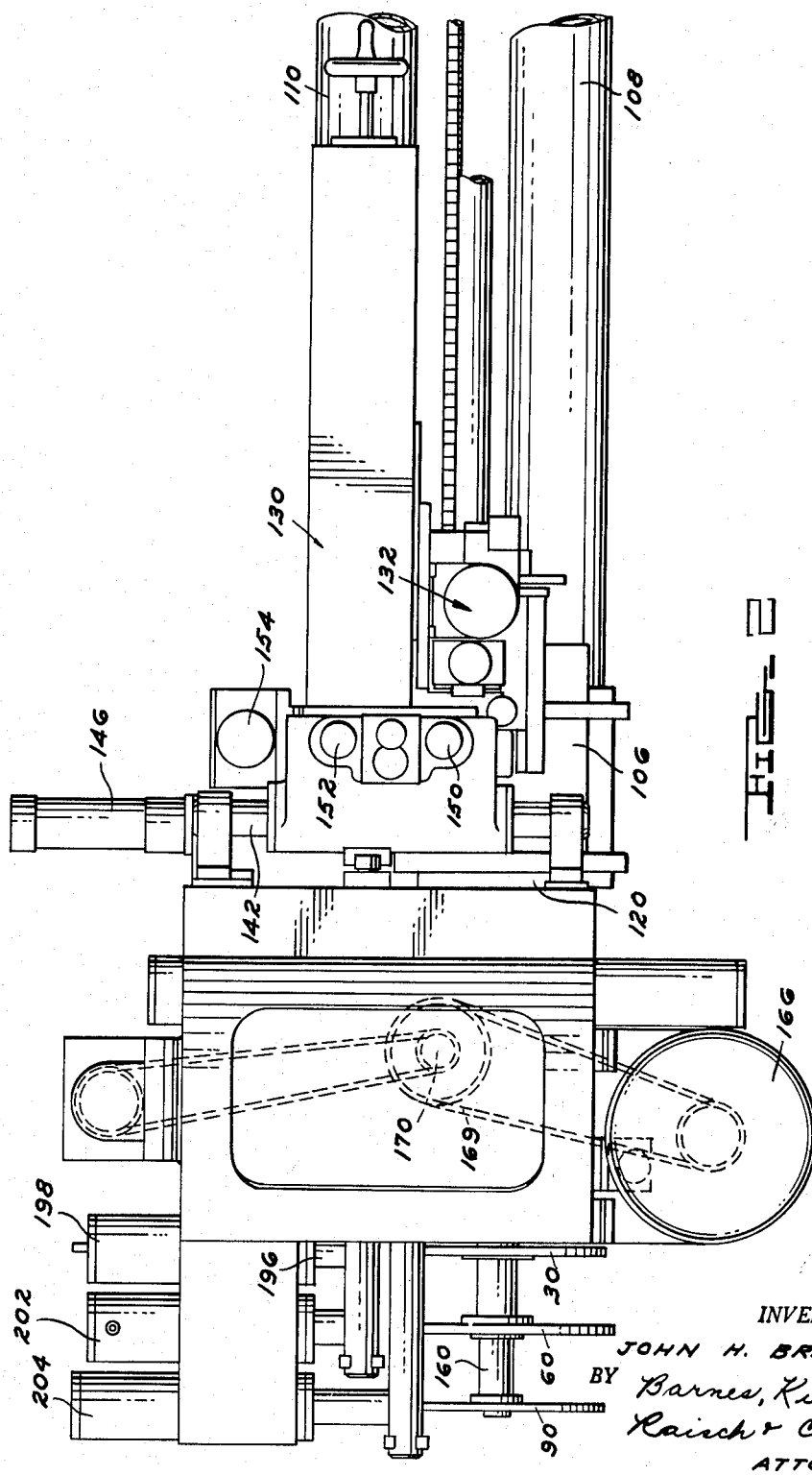

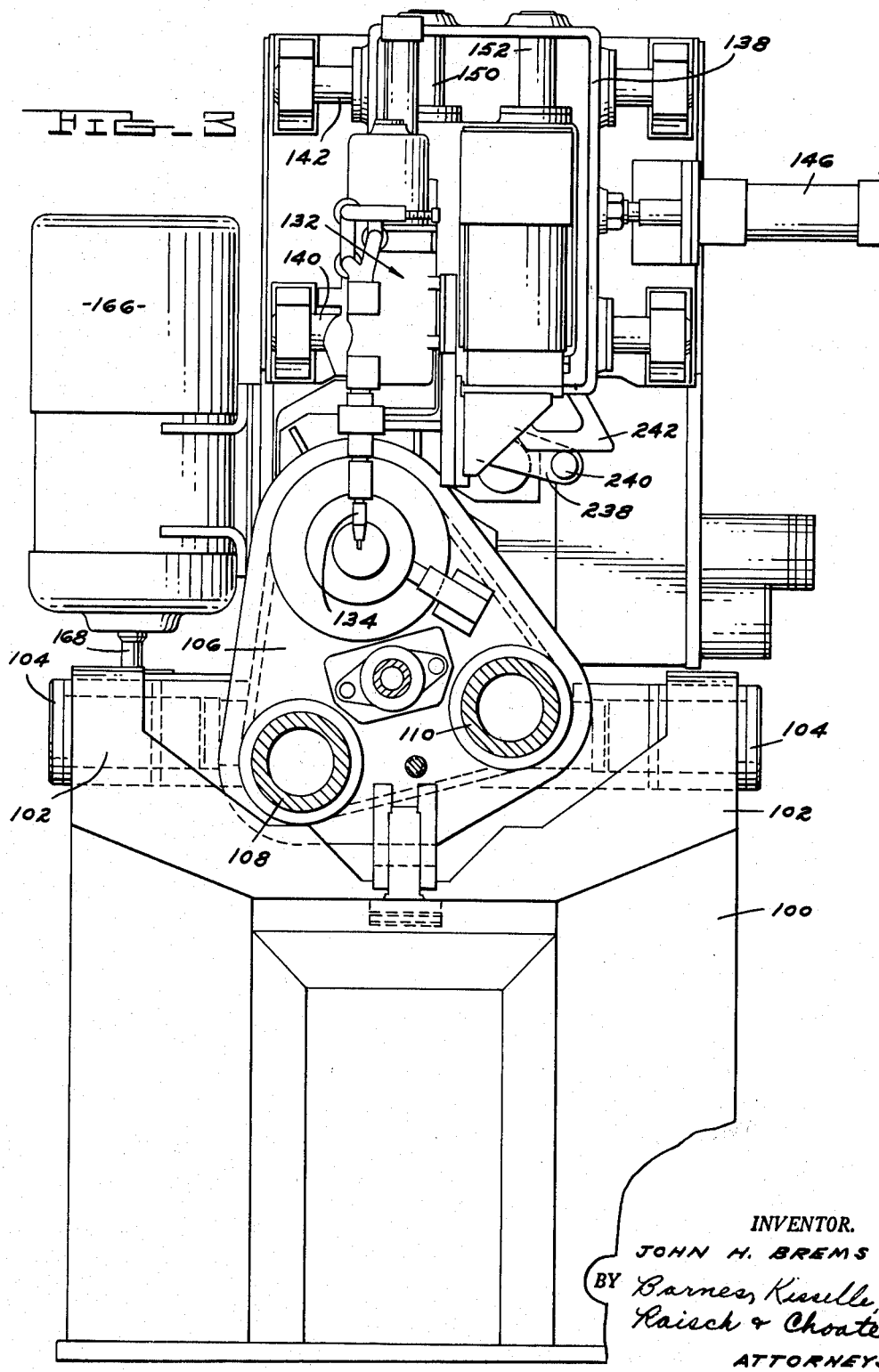

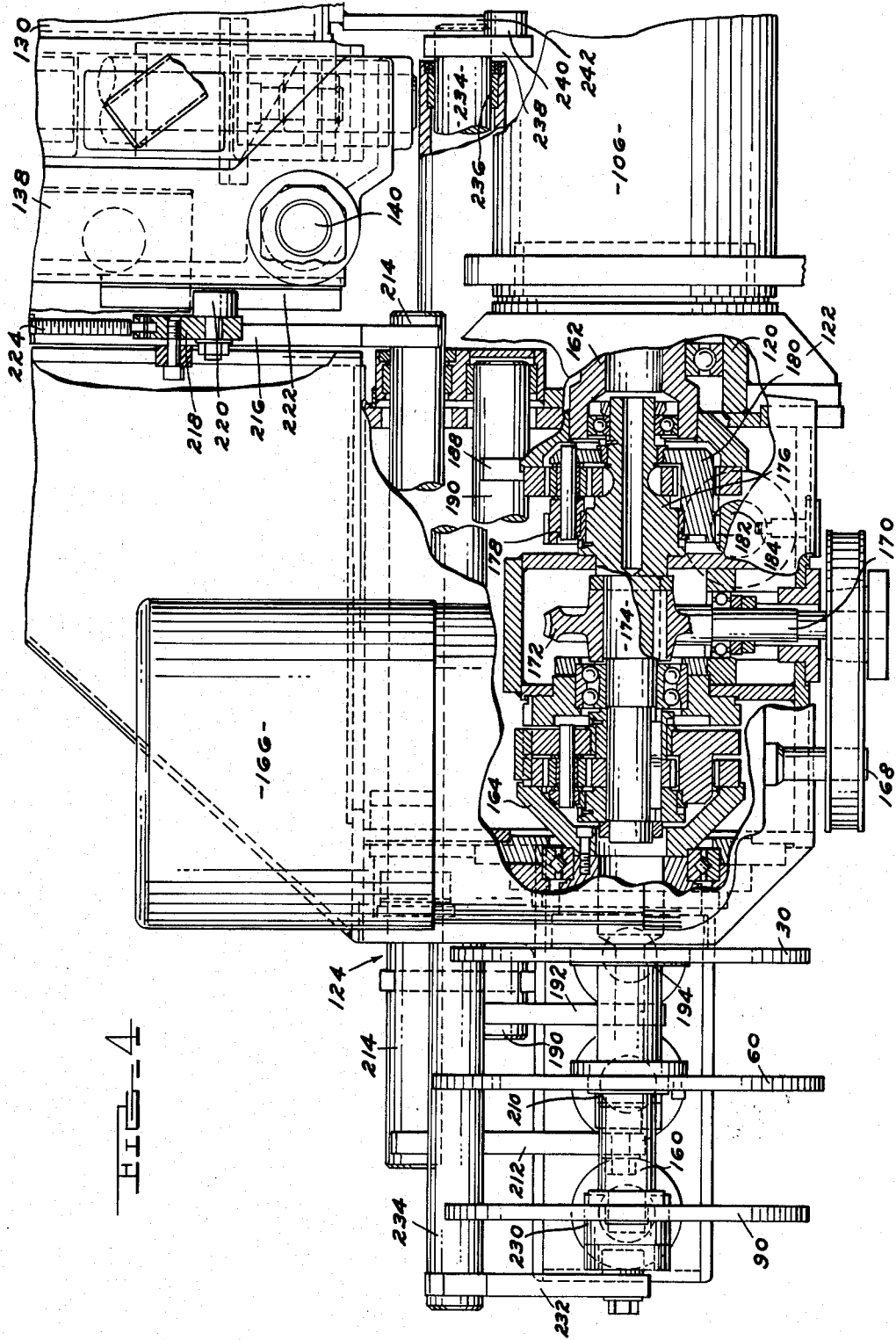

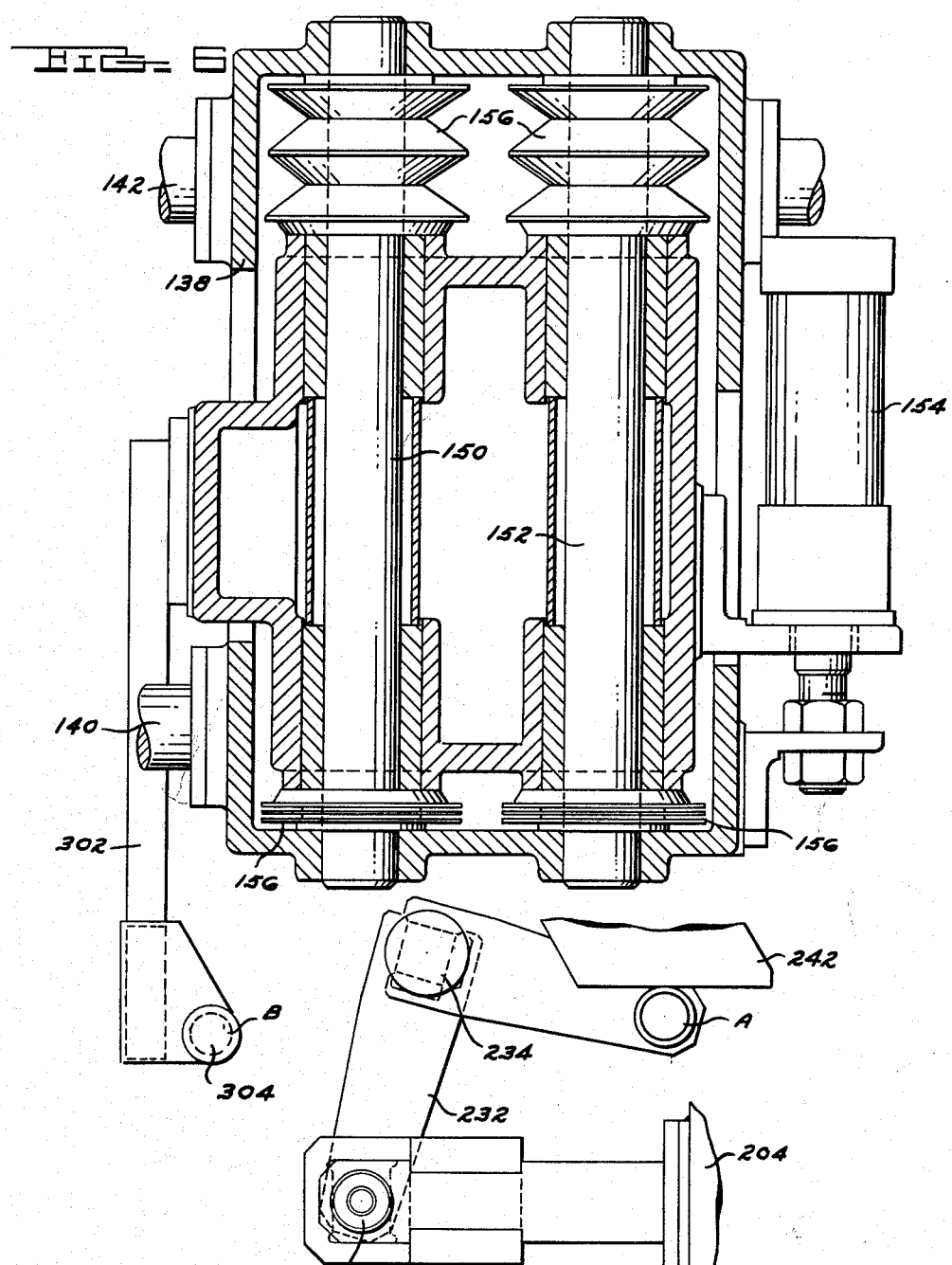

March 24, 1964   J. H. BREMS   3,126,472
CONTOUR WELDING MACHINE
Filed June 22, 1961   8 Sheets-Sheet 7
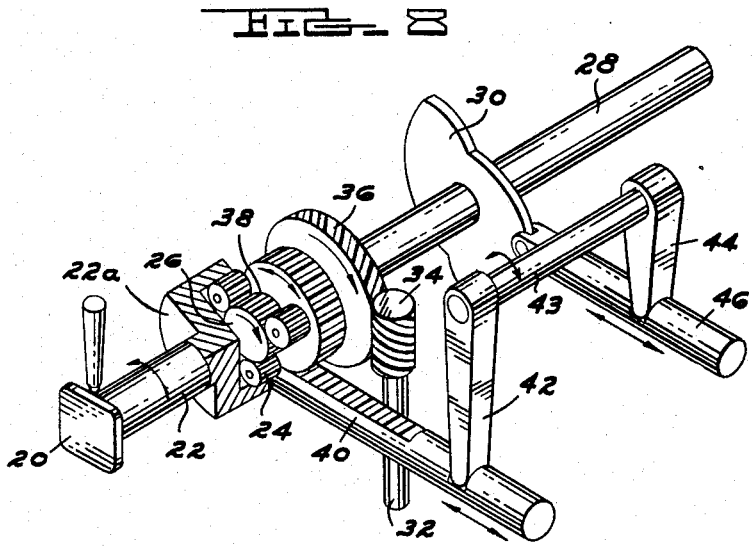
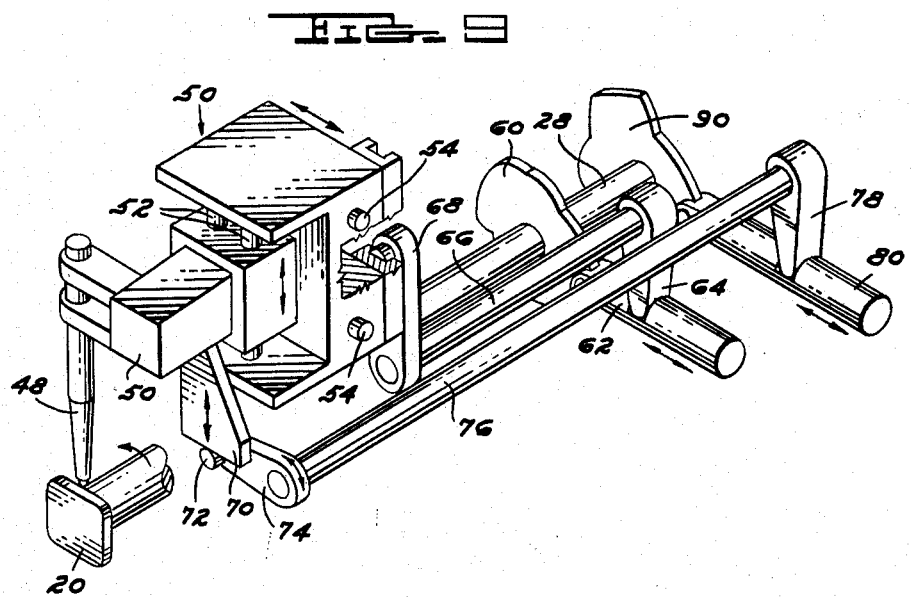
INVENTOR.
JOHN H. BREMS
BY
Barnes, Kisselle, Raisch & Choate
ATTORNEYS

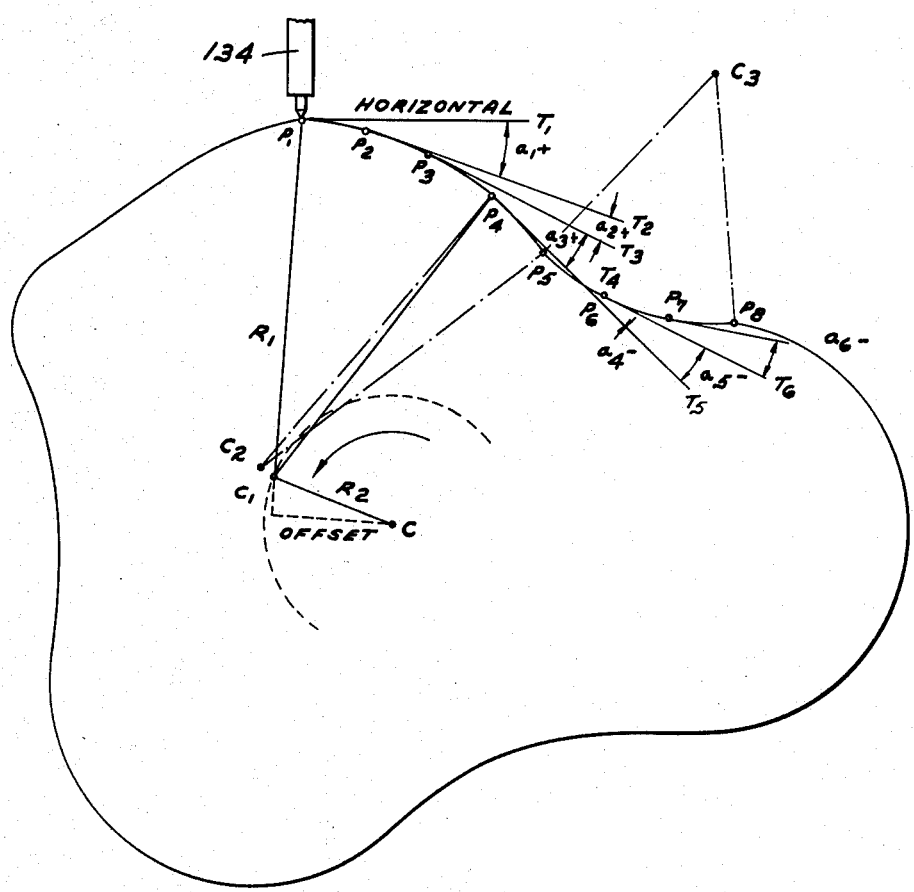

United States Patent Office 3,126,472
Patented Mar. 24, 1964

3,126,472
CONTOUR WELDING MACHINE
John H. Brems, 18478 Westhampton, Southfield, Mich.
Filed June 22, 1961, Ser. No. 118,823
19 Claims. (Cl. 219—124)

This invention relates to a contour welding machine and is particularly directed to a method and a machine for making welds of irregular contour.

It is an object of the present invention to provide a method and a machine for welding irregular contours with mechanical controls to provide, first a constant linear welding speed along the weld contour; second, a constant angle of torch to the weld contour; and, third, a constant angle of weld line to horizontal.

It is a further objective to meet the requirements of a welding machine for irregular contours by a mechanism having a variable speed of part rotation, a variable horizontal torch position and a variable vertical torch position, all of these variables being controlled by simple cams mathematically designed in accordance with a particular part.

It is another object of the invention to provide a machine which has an adjustable axis of rotation so that the torch position can be shifted relative to the work part and also a machine which can be provided with a double support for a work part such as an adjustable tailstock which is optionally available when required.

It is a further object to provide a machine of the type described which can be readily adapted to various parts by a change of the control cams.

Other objects and features of the invention relating to details of construction and operation will be apparent in the following description and claims.

Drawings accompanying the disclosure and the various views thereof may be briefly described as:

FIGURE 1, a side elevation of the device showing the relationship of the parts.

FIGURE 2, a top view of the machine.

FIGURE 3, a sectional view on line 3—3 of FIGURE 1.

FIGURE 4, an enlarged view of the drive cams and the driving mechanism partially in section.

FIGURE 5, a sectional view showing the horizontal slides taken at line 5—5 of FIGURE 1.

FIGURE 6, a view of the vertical slide elements of the device.

FIGURE 7, an elevation of vertical control linkage.

FIGURE 8, a diagrammatic view of one cam control for the speed control.

FIGURE 9, a diagrammatic view of the vertical and horizontal cam controls.

FIGURE 10, a view of a work part of arbitrary design illustrating the theory of the cam design construction.

General Theory of Machine

Referring, first of all, to FIGURE 10 where there is shown an arbitrary part contour, a completely arbitrary center of rotation C is chosen on the part. The part is to be rotated about this center at some variable rate, and this rate depends entirely upon the contour of the part and is determined in the following manner.

First, consider that the arbitrary curve has selected points $P_1$, $P_2$, $P_3$, etc. which are equally spaced and at each of these points tangent lines $T_1$, $T_2$, $T_3$, etc. are drawn. The angles between the adjacent tangent lines can then be labeled $a_1$, $a_2$, $a_3$, etc.

It will be seen that during the time interval that the weld has progressed from point $P_1$ to $P_2$, the part must rotate through the angle $a_1$. This is to meet the requirements of constant angle of weld line to horizontal. During the identical time interval that the weld progresses from $P_2$ to $P_3$, the part must rotate through the angle $a_2$. The time intervals are identical because of an assumed constant weld speed and identity of distance from point to point.

Since it is an object to keep the weld plane in a constant attitude to the torch, and since the successive angles are not necessarily equal although the time intervals are, the speed of rotation is varied. It will be plain that the sharper the curvature, the faster must be the speed of rotation.

In the case of a straight line, the rotation actually stops; and in the case of a concave curve, the rotation actually reverses. Thus, it is clear that the speed of rotation is a function only of the curvature of the part. In addition, of course, the torch must move vertically and horizontally as required to maintain constant welding speed.

The contour may be divided into a group of segments, each segment consisting of a straight line or a circular arc. If the radius of any arc is defined as $r$, and the speed of rotation as $w$, then the speed of rotation during any particular segment is: $w = K/r$, where K is a constant governed by the actual welding speed desired in inches per minute. In other words, the speed of rotation at any time is inversely proportional to the radius of the segment being welded. Stated another way, the speed of rotation at any point is proportional to the curvature of the part at that point.

It should be noted that the lineal welding speed may be held constant in the design of the machine as described above, or alternately a predetermined variation may be designed in, simply by varying K from segment to segment as may be desired. This technique can also be used with completely circular parts to increase or decrease the welding speed during welding. This situation has arisen where it is desired to build up the weld thickness by slowing down in critically stressed areas.

Once the relationship of part position to speed of rotation is established, the other two variables are then determined. It is known that the weld point progresses along the weld path at a uniform rate. It is also known that the angular position of the part progresses at a predetermined variable rate. Therefore, the part position is known at any time as well as the torch position on the part at any time. Accordingly, the torch position relative to the machine at any given instance can be determined, and, by plotting successive positions of the horizontal and vertical torch locations, the cam contours required to achieve these locations are found.

The foregoing is a graphical method of cam design for vertical and horizontal movement or offset. Another method involves only an analytical procedure. As stated above, the instantaneous rate of rotation is inversely proportional to the radius of curvature at the point being welded. Now if the center of curvature of the part at that point coincided with the center of rotation, the torch position would not need to change. This is the case with a circular part. If the center of curvature of the part does not coincide with the center of rotation, the torch must move vertically or horizontally or both.

The total movement of the part may be considered as consisting of two superimposed movements. The first component is an imaginary angular movement about the center of curvature at the angular rate that the part is actually rotating about the center of rotation. The second component would be an imaginary translation of this center of curvature along an arc whose center is the center of rotation, whose radius is the distance between center of curvature and center of rotation, at a velocity equal to the center to center distance multiplied by the angular velocity of the part. The sum of these two components is, of course, equal to the rotation of the part about the center of rotation.

Now consider the movement of the torch necessitated by the component of part rotating about center of curvature. The torch movement is zero. The second component is a translation of this center of rotation. Obviously, the torch movement must be equal to this translation. Otherwise, the torch would increase or decrease its distance from the part, which is not allowable.

The foregoing can be seen intuitively. It can be proven rigorously by vector analysis. The simple conclusions reached are as follows:

(1) The instantaneous speed of rotation is equal to the linear weld speed divided by the radius of curvature at that instant.

(2) The instantaneous movement of the torch is along a path parallel to and at a velocity equal to the movement of center of curvature about the center of rotation.

Additionally, an axial cam (not shown) can be used to move the torch along an axis parallel to the axis of rotation. With this addition, the machine is capable of making a three-dimensional weld at constant welding speed. In this application, the basic derivations described above remain valid provided only that the three-dimensional contour is projected into the plane of rotation. In so doing the linear weld speed desired is broken down into two components, one in the plane of rotation which is used in the analysis described above, the other parallel to the axis of rotation which is used to generate the axial cam.

*Diagrammatic FIGURES 8 and 9*

Referring now to the machine design, reference is specifically made to the simplified diagrammatic presentations of FIGURES 8 and 9 for any given work piece 20 as shown in FIGURE 8. There is a work mounting on a shaft 22 connected to the internal gear 22a and planetary gear set 24 with a sun gear 26 driven through a shaft 28 which carries a speed cam 30, power arriving through a shaft 32, worm gear 34 and a drive gear 36.

It will be seen that the actual output to the work piece 20 will be the result of the rotation of the sun gear 26 as modified by the rotation of the planetary gear set 24 on the planetary carrier 38 which is mounted in bearings on the sun gear shaft 28. The planetary carrier is controlled by a rack bar 40 actuated by linkage 42 and 44 controlled by a cam follower rod 46. If the planetary carrier is moved in the same direction as the sun gear, while the sun gear 26 moves at a constant velocity, the output shaft slows down. On the other hand, if the planetary carrier moves in the opposite direction of the sun gear, the output shaft speeds up. The planetary set, therefore, is the means of obtaining a variable speed output from a constantly rotating input shaft and a cam-generated planetary carrier movement.

The simplified diagram, FIGURE 8, is only intended to illustrate the principle of variable speed control through a cam driven planetary carrier. With the planetary carrier stationary, there is a reduction of 2:1 between the driving sun gear and the driven internal gear. Therefore in the actual machine, a compensating fixed 2:1 gear ratio is inserted between the sun gear and cam shaft. This is omitted in FIGURE 8 for clarity. The succeeding description is based on the inclusion of this fixed 2:1 ratio.

Regardless of speed variations during rotation, it is evident that one complete revolution of the output shaft takes place during one complete revolution of the cam shaft. Since, at the end of one revolution the cam is at the same place as at the beginning of a revolution, the cam obviously produces no change between the beginning and end points of a complete revolution. Since one complete revolution of the output or quill shaft takes place in one complete revolution of the cam shaft, it is further evident that the average speed of the quill shaft is the same as the speed of the cam shaft (which rotates at constant speed). At any point during a given revolution, the quill shaft may be either ahead of or behind its average speed. The angle that it is ahead of or behind the cam shaft is controlled by the position of the planetary gear carrier.

The linear rate of weld along the weld line is constant. The rate of cam shaft rotation is constant. Therefore, the two are proportional. Since the cam shaft makes a complete revolution while the complete traverse of the weld line is made, it follows that the cam shaft makes "360° divided by total weld length in inches" degrees of rotation per inch of weld. Therefore, the cam position at any point on the weld line is calculated by the simple relationship:

Degrees of Cam Rotation=

$$\text{Weld length to point} \times \frac{360}{\text{Total weld length}}$$

This is defined as the cam angle. There is a definite cam angle for every point on the weld line. There is also a definite quill angle for every point on the weld line. This quill angle is such that the tangent to the weld point is horizontal. (Horizontal is relative only since it changes as the machine is tilted backwards.) These angles are geometric properties of the part being welded. For any given point, the difference between quill angle and cam angle is the differential angle of that point. The differential angle is the amount that the quill shaft leads or lags the cam shaft. The speed cam is generated from a table made up of a list of cam angles against quill angles for a succession of arbitrarily spaced points around the weld line. When the cam angles are subtracted from the corresponding quill angles, the differential angles result. These differential angles plotted against the cam angle give the speed cam outline.

Mechanically, the speed cam drives a follower rod 46 which, through two arms 42, 44 on a torque shaft 43, drives a rack in mesh with a gear on the O.D. of the planetary pinion carrier. The arm ratio on the torque shaft is, for example, in the ratio of 5:8. For example, a 1″ rise of the cam causes a 1″ movement of the roller rod. This in turn causes an 8/5 or 1.6″ movement of the rack in mesh with the gear on the O.D. of the pinion carrier. When this gear has a pitch diameter of 6″, this rack movement causes an angular movement of the planetary carrier of 30.56°. The ratio of planetary carrier movement to output shaft is 2:3. Accordingly, the output shaft is moved forward 45.8° per inch rise of the speed cam. Stated another way, one degree advance of the output shaft requires a cam rise of 1/45.8=.02182″.

It is this constant which is used to convert differential angle to cam rise. Take a cam base circle with a 5″ radius and a follower roller with a radius of .375″. Therefore, to lay out the cam, we plot points on the cam angle lines (5.375+.02182×diff. angle) inches away from the center of the cam and draw circles of .375 radius about these points as centers. The envelope of these circles is the cam contour.

It is also necessary to have a horizontal or offset motion and a vertical motion of the welding head or torch. In connection with vertical movement if a circular part is being welded, the torch need not move up or down at all. However, in the case of a non-circular part, there must be a vertical compensation again generated by a cam.

In FIGURE 9 it will be seen that the welding torch 48 is carried by a head 50 which is vertically movable on slides 52 and horizontally movable on slides 54. The horizontal movement is controlled by a cam 60 which drives a cam follower 62 acting through linkage 64, 66 and 68 to act on the basic head unit 50. The vertical motion of the welding head is controlled through a plate 70 which rests on a cam follower 72 on link 74 controlled by a torque bar 76, another link 78 and a cam follower rod 80 which rides against a vertical control cam 90.

For offset motion, i.e., horizontal, assuming that the weld is made at 12 o'clock position, the weld point would be directly above the center of rotation when a circular part is welded. No offset motion is required for this type of part. When a non-circular part is welded, the welding head must shift horizontally to provide for constant welding speed. This motion is positive if in the direction of quill rotation, and negative if against it. Cam 60 provides for this motion in a way that a rise in the cam produces a movement of the offset slide in the direction of the quill movement.

During the course of a complete traverse the torch passes through a point of 0 offset at least twice. These points may be termed null points. It will be noted that at a null point the center of arc, center of rotation and weld point lie in a straight line. With these points in mind the offset can be determined with the following formula:

Offset=$R_2$ sin (quill angle—quill null angle) with $R_2$ defined as equal to the distance from the center of rotation to the center of the arc. Graphically, the offset at a given point may be determined by constructing a normal to the curve at that point and measuring the perpendicular distance from that point to the center of rotation (FIGURE 10).

For vertical motion, as stated, in the case of a non-circular part, the torch must move up and down during the weld. A quill shaft rotates at a varying speed as described. In the case of a straight line section it actually stops. Furthermore, in case of a concave section, the quill actually rotates backwards. The vertical cam 90 is mounted on the cam shaft 28 which always rotates in the forward direction at a constant speed. The construction of the vertical cam based on the mathematics of FIGURE 10, and keeping in mind the null angle position is:

Vertical rise=$R_1+R_2$ cos (quill angle—quill null angle) where $R_2$ is equal to the distance from center of rotation to the center of arc, and $R_1$ is the radius of the arc.

*Construction of Machine*

In FIGURE 1 the base of the machine is shown at 100 having spaced trunnion arms 102 with trunnion bearings 104 horizontally disposed to carry the entire load of the welding machine. A solid weldment housing 106 is trunnioned on the bearings 104 for movement on the horizontal axis.

Projecting forward from this weldment are two heavy support tubes 108 and 110 which extend to the right as shown in FIGURE 1. On the right-hand or extending end of these tubes is mounted a slidable tailstock assembly 112 controlled by a crankwheel 114. This tailstock assists in the support of a part having a longitudinal extent such as shown at 116 in dotted lines. Extending from the trunnion housing 106 is a support tube 120 buttressed by gusset plates 122 to support a rear assembly 124 on which is slidably mounted a welding head arm 130. This entire assembly is rotatable on a horizontal axis back and forth to permit control of the weld point with respect to any particular part. This motion can be controlled by a lead screw (not shown).

The welding head arm 130 carries a shiftable welding head assembly 132 which has a welding rod holder tool 134 at the work. This welding head assembly has an arcuate adjustment on the welding head 130 in conventional arrangement and the details of feeding the weld rod and the flux are also conventional.

In connection with the operation of the machine it is essential that the welding head 130 have a horizontal and vertical motion with respect to the basic support housing 124. As previously described, the horizontal movement is sometimes referred to as the offset motion. Accordingly, the head 130 is mounted on a frame 138 which in turn is mounted on horizontal slide bars 140 and 142 (FIGURE 5), there being suitable protective covers 144 at the ends of the slides to protect the bearing surfaces. A horizontal counterbalance cylinder 146 is associated with the slide 130 to reduce the amount of energy required to shift the slide. The head 130 is associated with the frame 138 through vertical slide bars 150 and 152 mounted on the frame 138 and a vertical counterbalance mechanism 154 is provided again to facilitate the ease of motion of the head 130. Again suitable dust protector bellows 156 can be applied to the end of the bearing rods.

The mechanism for actuating the head 130 originates in a cam shaft 160 (FIGURES 1 and 4) at the rear of the machine, this shaft carrying a spindle speed cam 30, a horizontal or offset feed cam 60 and a vertical control cam 90. This cam shaft 160 is connected to the work spindle 162 through a double planetary gear set.

The first planetary gear set indicated generally at 164 has a function of changing the ratio of speed between the intermediate shaft 174 and the cam shaft 160. It will be seen that the power from motor 166 comes from a motor shaft 168 through suitable gearing or belting 169 to a worm gear shaft 170, this driving the worm gear 172 associated with the intermediate shaft 174. Normally, there is a 2 to 1 reduction between the cam shaft 160 and the spindle so that the rear planetary seat is locked up and all the cams operate at a speed twice the average speed of the output or spindle shaft. This is suitable for symmetrical parts. If a non-symmetrical part is being run, it is necessary to have a 1 to 1 ratio between the cam shaft and the spindle and the planetary gear set 164 when unlocked provides this 1 to 1 ratio. The forward planetary gear set performs the function of the set shown in FIGURE 8. The center gear 176 (FIGURE 4) driven by the shaft 174 and the worm gear 172 is located inside the planetary pinions 178 on the carrier 180, the carrier having external gear teeth at 182 which engage the teeth of a rack bar 184 (FIGURE 5) which is suitably mounted for horizontal sliding motion in bearings 186. This bar 184 compares with the bar 40 of FIGURE 8. The bar 184 is controlled by a link 188 on a speed control torque bar 190 which has a cam follower link 192 engaging cam 30. The cam follower element 194 is mounted on a rod 196 which slides in a cylinder 198 (FIGURE 5) under the bias of a spring 200 or any suitable fluid biasing device to keep the follower in contact with the cam. Each of the cam followers will have a similar device as shown by the housings 202 and 204 (FIGURE 2). The contours, therefore, of the speed cam 30 will reflect in the horizontal motion of the rod 184 which controls the position of the planetary carrier 180 and thus reflects on the speed of the output shaft 162 geared to the planetary carrier.

The offset or horizontal control for the slide 130 originates at the cam 60 which has a follower roller 210 on a link 212 secured to the horizontal control torque bar 214 suitably mounted in bearings and having a riser link 216 carrying an adjustable follower mechanism 218 having a roller 220 which acts in a groove 222 on supporting frame 138. A screw 224 controls the position of cam follower 220 (FIGURE 5) the cam follower 218 being slidable in a frame 226 formed in the riser link 216. Thus, motion of the follower on cam 60 will be reflected in the motion of the follower 220 which will actuate the frame 138 horizontally carrying with it the head 130. This mechanism produces a variable ratio between the horizontal control torque bar and the horizontal slide, and is used for such times as link 254 is used as explained below. In such cases this variable ratio permits adjustment for the desired factor of proportionately between offset movement and speed cam profile.

The vertical motion of the head 130 is controlled by the cam 90 which has a follower mechanism 230 on a link 232 depending from the vertical control torque bar 234 which extends through suitable mounting bearings 236 to a point adjacent the work mounting where a link 238 with a follower 240 bears against the lower surface of a vertical support plate 242. Plate 242 is mounted in dependent relation to the welding head 130. Thus rotation of the cam 90 transmits the proper vertical motion through the follower 230 and the torque control rod 234 to the follower 240 where it reflects in the vertical motion of the head 130 on the vertical slide shafts 150 and 152.

In FIGURE 5 the dotted linkage slightly below center of the view comprises a link 250 on the speed torque control rod 190 and a link 252 on the horizontal control rod 214, these links being tied together by a vertical link element 254. In certain circumstances, it is possible to link the horizontal torque bar with the speed control bar utilizing a single cam for their operation, thus avoiding the necessity of one cam in the assembly. When this is done, the links 250 and 252 are connected by link 254; otherwise link 254 is removed.

*Operation of the Device*

The entire trunnion assembly may be hoisted to a certain angle through a link 260 controlled by a motor 262 through suitable gearing so that the proper weld angle is obtained for the particular part. The device, as above described, can now be operated to make a continuous weld on a part 116, for example, which is rotated on the quill 162. The cams having been designed according to the description are located on the shaft 160. The electrical circuitry is connected to the welding unit 132 and the device is started. The work rotates at a speed determined by the basic input to the worm gear 172 as modified by the forward planetary gearing assembly as reflected by the motion of the cam 30. At the same time, the offset motion is controlled by cam 60 in the horizontal movement and the vertical motion is controlled by the cam 90 so that the point of the weld 134 is maintained in an accurate position relative to the part as it rotates with a constant weld speed.

An optional fourth cam 300 can be mounted directly on the quill to substitute for the vertical motion cam in cases where the work part has no concave sections. A rigid arm 302 extending downwardly at an angle from the head 130 (see FIGURE 1) has a follower 304 which rides directly on the cam 162.

As previously indicated, an axial cam (not shown) can be also operated by the cam shaft 160 to move the slide 130 along an axis parallel to the axis of rotation of the part. With this adaptation, a three-dimensional weld can be accomplished.

I claim:

1. A welding machine comprising a rotatable work mount, a welding torch, means to mount said torch adjacent said work mount to maintain a constant attitude toward a work piece in said mount, power means to rotate said work mount and means to control the speed of said work mount to maintain a constant weld speed as said work rotates comprising a planetary gear set interposed between said power means and said work mount, translatable means to vary the position of an element in said planetary gear set to control the output of said set, a shaft driven by said power means, a cam driven by said shaft, and a follower responsive to said cam contour connected to said translatable means, said cam being designed to rotate said work to maintain a constant welding speed at torch contact.

2. A welding machine for performing a continuous weld around a contoured work part with a controlled predetermined speed and controlled weld position relative to the point of tangency of the weld which comprises a rotatable work mount, a welding torch, torch mounting means for movably mounting said welding torch adjacent said work mount, power means for rotating said work mount and moving said welding torch, and a plurality of cams driven by said power means connected operatively with said torch mounting means and said work mount to control the speed of rotation of said work mount and the relative position of said welding torch to said work mount to insure a predetermined torch attitude and speed.

3. A device as defined in claim 2 in which one of said cams is mechanically associated with said welding torch to control its vertical position relative to said work mount, a speed control mechanism interposed between said power means and said work mount, a control element on said mechanism, and a mechanical connection between said element and one of said cams to control the speed of said work mount.

4. A device as defined in claim 3 in which a third cam is driven by said power means, and a mechanical connection between said third cam and said welding torch to control the horizontal position of the torch relative to said work mount.

5. A device as defined in claim 2 in which said plurality of cams are mounted on a common shaft for rotation by said power means, a plurality of cam followers related to said cams, a torque bar associated with each cam follower, and means on said torque bars operatively connected to said welding torch and said work mount.

6. A device as defined in claim 2 in which said welding torch is mounted for mechanical translation motion horizontally and vertically, cam follower means connecting two of said cams to said welding torch each to control one of said translation motions, a speed control element associated with said work mount, and cam follower means connecting said element with another of said cams.

7. A device as defined in claim 2 in which said plurality of cams comprise three cams, one of which is operatively connected to said welding torch to control the vertical position of said torch, and two of which are operatively connected respectively with said work mount and said welding torch to control the speed of rotation of said work mount and the relative position of said welding torch horizontally with respect to said work mount whereby to control the relative speed of a piece of work in said work mount to the welding torch.

8. A device as defined in claim 2 in which said torch mounting means comprises a head, slide means mounting said head for vertical and horizontal translation, a speed control connecting said power means and said work mount, a control element on said speed control, and means operatively connecting said cams with said head and said control element.

9. A device as defined in claim 2 in which said cams are two in number, a first cam contoured to control speed of rotation of said work mount based on rotation about an arbitrary center in a particular work part to insure predetermined torch speed relative to said work part, the second cam being contoured to control the vertical position of said torch to position the torch relative to said arbitrary center of a particular work part, and a speed control interposed between said first cam and said work mount.

10. A device as defined in claim 2 in which said cams are three in number, a first cam contoured to control speed of rotation of said work mount based on rotation about an arbitrary center in a particular work part to insure predetermined torch speed relative to said work part, a second cam contoured to control the vertical position of said torch to position the torch relative to said arbitrary center of a particular work part, and a third cam contoured to control the horizontal position of the torch to insure a predetermined torch attitude to a particular work part relative to horizontal, said cams operating simultaneously, and a speed control interposed between said first cam and said work mount.

11. A device as defined in claim 10 in which said third cam is contoured to maintain said torch in a position perpendicular to the tangent of a contoured work part at the point of weld.

12. A welding machine for performing a continuous weld around a contoured work part with a controlled predetermined speed and controlled weld position which comprises a base, a body trunnioned to said base, a rotatable work support on said body, a power means on said body, multiple planetary gear sets operatively connected between said power means and said rotatable work support, a speed control related to one of said planetary gear sets comprising a control element adapted to control the position of one of the elements of said one of said gear sets, the other of said gear sets being adapted to change the relative power ratio between said power means and said work support, a cam shaft on said body operated by said power means in a predetermined speed ratio relative to said work support, a torch support on said body comprising a movable head, a torch assembly on said head adjustable relative thereto and adjacent said work support, means mounting said head to have a horizontal and vertical motion relative to said body comprising a pair of horizontal slides on said body, a frame slidably mounted on said slides, a pair of vertical slides on said frame, a pair of slides on said head associated with said vertical slides on said frame, a first cam on said cam shaft for controlling the vertical position of said head, a first cam follower associated with said first cam, a first torque bar associated with said first cam follower, and means on said torque bar in contact with said head, a second cam on said cam shaft for controlling the horizontal position of said head, a second cam follower associated with said second cam, a second torque bar actuated by said second cam follower, means connecting said torque bar to said head to control the horizontal motion of said head, a third cam on said cam shaft having a third cam follower mechanically associated with the control element of said one of said planetary gear sets whereby, upon rotation of said work support and said cam shaft by said power means, said torch is made to follow a contour of a work part in a controlled relative speed relationship to said part and a controlled position following the weld line of said part.

13. A device as defined in claim 12 in which a fourth cam is mounted adjacent said work support for rotation therewith, and a cam follower mounted on said head for receiving direct vertical control from said fourth cam.

14. A device as defined in claim 12 in which the cam follower means for the third cam has a third torque bar associated therewith, and means for connecting the second and third torque bars for simultaneous motion.

15. A device as defined in claim 14 in which the connection of said second torque bar to said head is adjustable to permit a varying of the relationship to said head.

16. A method of welding around a contoured part which comprises selecting an arbitrary center on a particular work part, rotating the work about said center, positioning a weld torch relative to the tangent at a point on the weld line, simultaneously shifting the weld torch horizontally and vertically to maintain the same relative position of said torch to the tangent at any point on the weld line, and varying the speed of rotation to compensate for said shifting and to maintain constant the relative motion of said torch along said weld line.

17. A welding machine comprising a rotatable work mount, a welding torch, a weld head adjacent said work mount for mounting said torch, first means mounting said head for angular and lateral positioning of said torch relative to said work mount, a second means mounting said first means for selective and simultaneous horizontal and vertical motion relative to said work mount to compensate for change of contour of a piece of work in said work mount, a first cam follower on said first means to control horizontal position of said first means, a second cam follower on said first means to control vertical position of said first means, a first cam to control said first cam follower, a second cam to control said second cam follower, and means actuating said cams simultaneously to effect a contour motion of said torch relative to a work piece.

18. A welding machine comprising a rotatable work mount, a welding torch, a weld head adjacent said work mount for mounting said torch, first means mounting said head for angular and lateral positioning of said torch relative to said work mount, a second means mounting said first means for selective and simultaneous horizontal and vertical motion relative to said work mount to compensate for change of contour of a piece of work in said work mount, a first cam follower on said first means to control horizontal position of said first means, a second cam follower on said first means to control vertical position of said first means, a first cam to control said first cam follower, a second cam to control said second cam follower, means actuating said cams simultaneously to effect a contour motion of said torch relative to a work piece, the first and second cams being designed each to control the component of motion respectively in a horizontal motion and a vertical motion.

19. A welding machine comprising a rotatable work mount, a welding torch, a weld head adjacent said work mount for mounting said torch, first means mounting said head for angular and lateral positioning of said torch relative to said work mount, a second means mounting said first means for selective and simultaneous horizontal and vertical motion relative to said work mount to compensate for change of contour of a piece of work in said work mount, the second means for mounting said first means comprising a frame, vertical slides on said frame, complemental slides on said first means to co-act with said vertical slides, a basic support for said head, horizontal slides on said basic support, and complemental slides on said frame to co-act with said horizontal slides wherein said second means may be shifted to an infinite number of positions within the confines of said slides.

References Cited in the file of this patent

UNITED STATES PATENTS

| | | |
|---|---|---|
| 1,550,651 | Charter | Aug. 18, 1925 |
| 1,957,489 | Cornstock | May 8, 1934 |
| 2,927,195 | Arnaud | Mar. 1, 1960 |